United States Patent

Kaneko

(10) Patent No.: US 9,657,697 B2
(45) Date of Patent: May 23, 2017

(54) INTAKE DUCT

(71) Applicant: TOYOTA BOSHOKU KABUSHIKI KAISHA, Aichi-ken (JP)

(72) Inventor: Eiko Kaneko, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 129 days.

(21) Appl. No.: 14/625,224

(22) Filed: Feb. 18, 2015

(65) Prior Publication Data

US 2015/0240761 A1 Aug. 27, 2015

(30) Foreign Application Priority Data

Feb. 21, 2014 (JP) ................................. 2014-031600

(51) Int. Cl.
*F02P 5/04* (2006.01)
*F02M 35/108* (2006.01)
*F02M 35/10* (2006.01)

(52) U.S. Cl.
CPC ..... *F02M 35/108* (2013.01); *F02M 35/10262* (2013.01); *Y02T 10/146* (2013.01)

(58) Field of Classification Search
CPC ....................... F02M 35/109; F02M 35/10262
USPC ..... 123/302, 308, 432, 306, 184.37, 184.45, 123/184.52
See application file for complete search history.

(56) References Cited

U.S. PATENT DOCUMENTS

| | | | | |
|---|---|---|---|---|
| 4,164,205 A | * | 8/1979 | Asanomi | F02P 5/103 123/184.52 |
| 4,271,795 A | * | 6/1981 | Nakagawa | F02B 31/08 123/188.14 |
| 4,450,803 A | * | 5/1984 | Namba | F02B 23/08 123/184.45 |
| 4,481,922 A | * | 11/1984 | Sugiura | F02B 31/08 123/184.45 |
| 4,543,931 A | * | 10/1985 | Hitomi | F02B 23/08 123/184.45 |
| 4,545,347 A | * | 10/1985 | Morikawa | F02B 29/02 123/308 |

(Continued)

FOREIGN PATENT DOCUMENTS

JP 2001-193469 7/2001
JP 2012-102623 5/2012

OTHER PUBLICATIONS

Official Action in JP Appl. No. 2014-031600 mailed Mar. 28, 2017.

*Primary Examiner* — Marguerite McMahon
(74) *Attorney, Agent, or Firm* — Greenblum & Bernstein, PLC

(57) ABSTRACT

An intake duct is adapted to be connected to an intake port of a cylinder head. A branch pipe of the intake manifold has in it a partition extending in a direction of intake air flow, a main passage and a tumble flow passage serving as an auxiliary passage that are defined by the partition, and a valve that opens and closes the main passage. A restrictor that minimizes the cross-sectional area of the tumble flow passage is formed between the upstream end and the downstream end in the direction of intake air flow of the tumble flow passage. The cross-sectional area of the tumble flow passage decreases from the upstream end toward the restrictor and increases from the restrictor toward the downstream end.

3 Claims, 2 Drawing Sheets

(56) References Cited

U.S. PATENT DOCUMENTS

| | | | | |
|---|---|---|---|---|
| 5,267,543 A | * | 12/1993 | Novak | F02B 31/08 |
| | | | | 123/184.52 |
| 5,937,815 A | * | 8/1999 | Hidaka | F02B 27/02 |
| | | | | 123/184.56 |
| 6,915,774 B2 | * | 7/2005 | Sakai | F02B 23/08 |
| | | | | 123/184.52 |
| 7,886,708 B2 | * | 2/2011 | Tominaga | F02B 31/04 |
| | | | | 123/184.27 |
| 2002/0020389 A1 | | 2/2002 | Wolters | |
| 2009/0235890 A1 | | 9/2009 | Maeda | |

* cited by examiner

INTAKE DUCT

BACKGROUND OF THE INVENTION

The present invention relates to an intake duct such as an intake manifold connected to suction ports of a cylinder head.

Japanese Laid-Open Patent Publication No. 2012-102623 discloses an intake duct that includes a main passage, an auxiliary passage, a partition separating the main passage and the auxiliary passage from each other, and a valve for opening and closing the main passage. When the engine combustion tends to be unstable, such as during a cold start, the valve closes the main passage so that intake air flows through the auxiliary passage. This increases the flow velocity of the intake air, generating flows such as tumble flows of the intake air introduced into the cylinders. As a result, the engine combustion is stabilized without significantly increasing the fuel injection amount.

In the intake manifold of the above document, the cross-sectional area of the auxiliary passage decreases toward the downstream side and is minimized at the downstream end. This further increases the flow velocity when the intake air flows through the auxiliary passage, intensifying the flows such as tumble flows, which are introduced into the cylinders. The engine combustion is further stabilized, accordingly.

The passage cross-sectional area at the downstream end of an intake duct (the sum of the cross-sectional area of the main passage and the cross-sectional area of the auxiliary passage) is determined with reference to the cross-sectional area of the intake port to which the downstream end is connected. Therefore, in a structure in which the cross-sectional area of the auxiliary passage is minimized at the downstream end and increased toward the upstream side as in the intake duct of the above document, the following problems may be present. That is, since the cross-sectional area of the auxiliary passage is increased at the upstream end, the cross-sectional area in the vicinity of the upstream end may be greater than the ideal cross-sectional area for maximizing the intake efficiency of intake air into the cylinders in an engine operating state with the valve open. This results in an insufficient intake of air into the cylinders, which restrains the engine power from being increased.

SUMMARY OF INVENTION

Accordingly, it is an objective of the present invention to provide an intake duct that is capable of increasing engine output while stabilizing engine combustion.

To achieve the foregoing objective, an intake duct adapted to be connected to an intake port of a cylinder head is provided. The intake duct includes therein a partition extending in a direction of intake air flow, a main passage and an auxiliary passage that are defined by the partition, and a valve that opens and closes the main passage. A restrictor that minimizes a cross-sectional area of the auxiliary passage is formed between an upstream end and a downstream end in the direction of intake air flow of the auxiliary passage.

According to this configuration, the restrictor, which is formed in the auxiliary passage, increases the flow velocity of intake air when the intake air flows to the restrictor in the auxiliary passage. This intensifies flows such as tumble flows generated when the intake air flows through the auxiliary passage. Therefore, when the engine combustion tends to be unstable, such as during a cold start, the engine combustion is stabilized.

In the above configuration, the restrictor is located between the upstream end and the downstream end of the intake flow direction of the auxiliary passage. Thus, while increasing the flow velocity of the intake air flowing though the auxiliary passage, the cross-sectional area of the upstream end of the auxiliary passage can be made small compared to a conventional structure in which the cross-sectional area of the auxiliary passage increases from the downstream end toward the upstream end in the direction of the intake flow. This reduces the sum of the cross-sectional area of the main passage and the cross-sectional area of the auxiliary passage in the vicinity of the upstream end of the auxiliary passage (hereinafter, referred to as a passage cross-sectional area of the intake duct). It is thus possible to bring the passage cross-sectional area of the intake duct in the vicinity of the upstream end of the auxiliary passage closer to the ideal cross-sectional area for maximizing the intake efficiency of intake air into the cylinders with the valve open. This allows a greater amount of intake air to be drawn into the cylinders so that the engine output is increased.

DETAILED DESCRIPTION OF THE PREFERRED EMBODIMENTS

An intake duct according to one embodiment of the present invention will now be described with reference to FIGS. 1 to 3C. In the present embodiment, the intake duct is employed as an intake manifold for an inline four-cylinder internal combustion engine. Hereinbelow, the upstream side and the downstream side in the flowing direction of intake air will be simply referred to as the upstream side and the downstream side.

Figure 1:
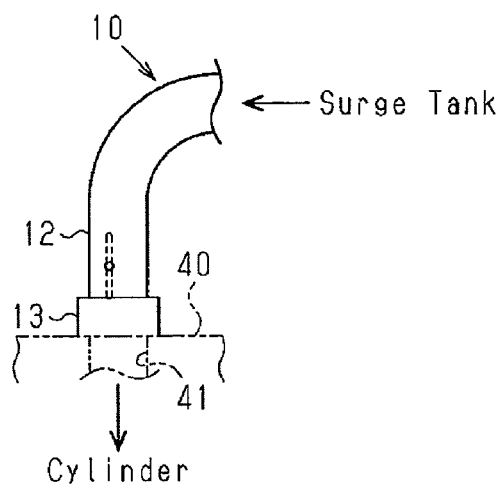
FIG. 1 is a front view showing an intake manifold according to one embodiment.

As shown in FIG. 1, the intake manifold of the present embodiment includes a manifold main body 10, which is made of a heat resistant plastic such as a polyamide plastic. The manifold main body 10 includes a surge tank and branch pipes 12 that branch from the surge tank. FIG. 1 illustrates one of the four branch pipes 12. Each branch pipe 12 is connected to a corresponding intake port 41 of a cylinder head 40 of the internal combustion engine via a flange 13 provided at the downstream end of the branch pipe 12.

The upstream end of the surge tank is connected to a duct that delivers intake air to the surge tank after the intake air is filtered by an air cleaner (not shown). The intake air in the surge tank is conducted to the cylinders, or the combustion chambers, in the engine via the branch pipes 12.

Figure 2A:
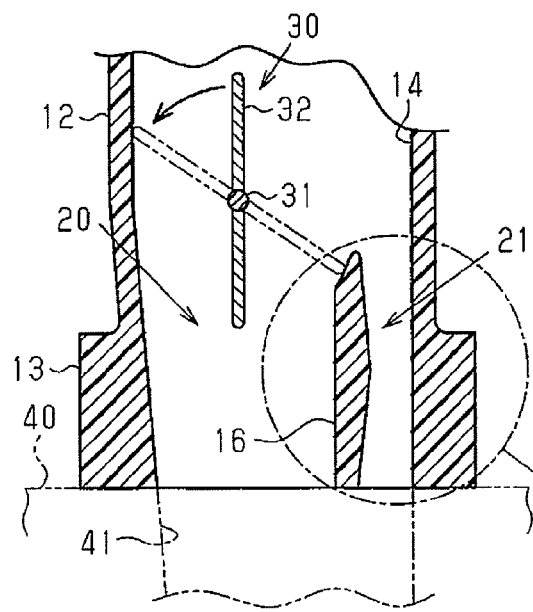
FIG. 2A is a cross-sectional view showing a downstream end portion in the flowing direction of intake air of a branch pipe in the intake manifold shown in FIG. 1.

As shown in FIG. 2A, each branch pipe 12 has a partition 16, which is located inside a downstream end portion and extends in the direction of intake air flow. The partition 16 divides the interior of the branch pipe 12 into a main passage 20 and an auxiliary passage, which is a tumble flow passage 21. The cross-sectional area of the tumble flow passage 21 is set to be smaller than the cross-sectional area of the main passage 20.

A surface of an inner wall 14 of the branch pipe 12 that forms the tumble flow passage 21 (hereinafter, referred to as a flow passage surface 15) extends perpendicular to the end face at the downstream side of the branch pipe 12.

Figure 2B:
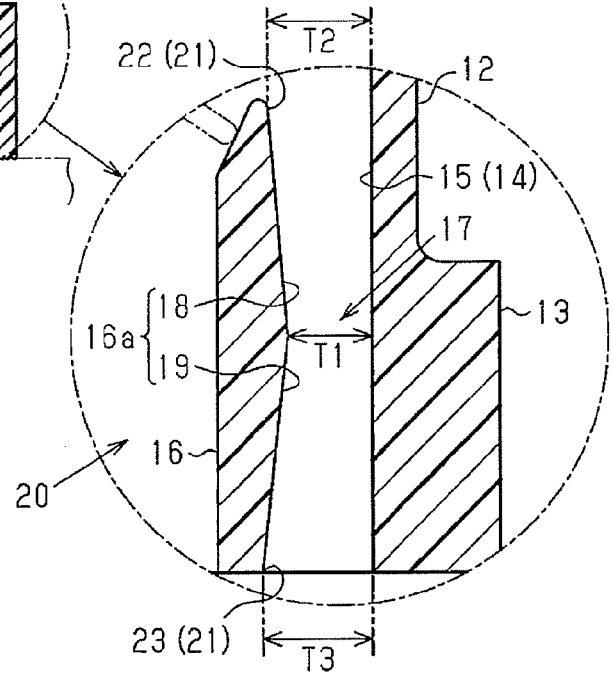
FIG. 2B is an enlarged partial cross-sectional view illustrating the part surrounded by the long dashed short dashed line in FIG. 2A.

As shown in FIG. 2B, an inner wall surface 16a of the partition 16 that forms the tumble flow passage 21 bulges toward the flow passage surface 15. The inner wall surface 16a is formed by an upstream-side inclined surface 18 and a downstream-side inclined surface 19. The upstream-side inclined surface 18 has an up-grade, which is inclined from an upstream end 22 to the middle of the inner wall surface 16a. The downstream-side inclined surface 19 has a down-grade, which is inclined from the middle of the inner wall surface 16a to a downstream end 23 of the tumble flow passage 21. Therefore, a restrictor 17 is formed between the upstream end 22 and the downstream end 23 of the tumble flow passage 21. The restrictor 17 minimizes the cross-sectional area of the tumble flow passage 21 in the intake flow direction. That is, the cross-sectional area of the tumble flow passage 21 decreases from the upstream end 22 to the restrictor 17 and increases from the restrictor 17 to the downstream end 23. The cross-sectional area T1 of the restrictor 17 is smaller than the cross-sectional area T2 of the upstream end 22 and the cross-sectional area T3 of the downstream end 23 (T1<T2, T3). The restrictor 17 is located at midpoint between the upstream end 22 and the downstream end 23 of the tumble flow passage 21. The rate at which the cross-sectional area of the tumble flow passage 21 changes is small enough not to cause problems regarding the pressure loss of the intake air flowing through the tumble flow passage 21 and not to generate burbles of the intake air.

As shown in FIG. 2A, a tumble control valve (hereinafter, simply referred to as a valve) 30 for opening and closing the main passage 20 is located inside the downstream end portion of the branch pipe 12. The valve 30 is formed by a valve shaft 31 and a valve main body 32. The valve shaft 31 is rotationally supported by the branch pipe 12. The valve main body 32 is fixed to the valve shaft 31. One end of the valve shaft 31 is coupled to an actuator (not shown) located outside the branch pipe 12. When the actuator rotates the valve shaft 31, the valve main body 32 is switched between a position for opening the main passage 20 (the position represented by solid lines in FIG. 2A) and a position for closing the main passage 20 (the position represented by long dashed double-short dashed lines in FIG. 2A).

Operation of the present embodiment will now be described.

In the intake manifold according to the present embodiment, the cross-sectional area of the tumble flow passage 21 decreases from the upstream end 22 of the tumble flow passage 21 to the restrictor 17, that is, from the upstream end 22 toward the downstream side. Further, the cross-sectional area of the tumble flow passage 21 increases from the restrictor 17 to the downstream end 23, that is, from the restrictor 17 toward the downstream side. Thus, when the intake air flows in the tumble flow passage 21 toward the restrictor 17, the flow velocity of the intake air is increased, so that tumble flow is intensified. Therefore, when the engine combustion tends to be unstable, such as during a cold start, the engine combustion is stabilized while restraining increase in the fuel injection amount.

Figure 3A:
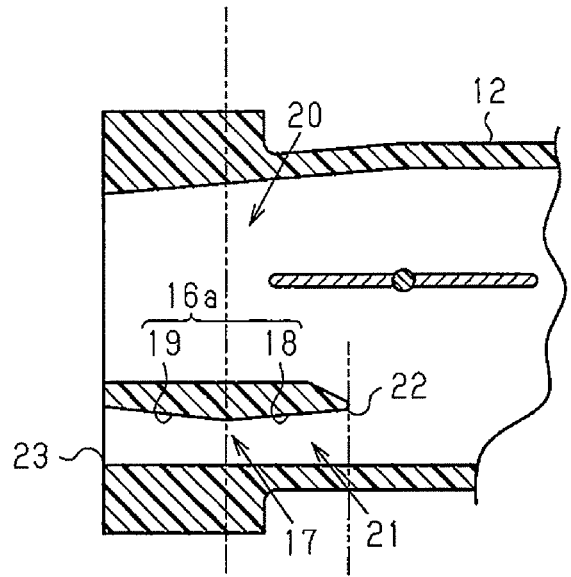
FIG. 3A is a cross-sectional view showing a downstream end portion in the flowing direction of intake air of a branch pipe in the intake manifold shown in FIG. 1.
Figure 3B:
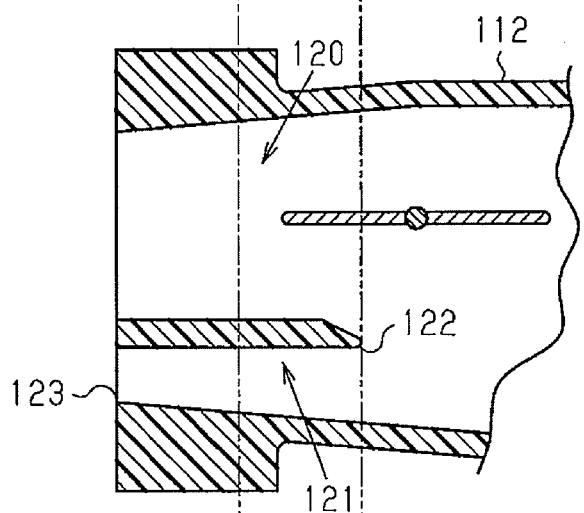
FIG. 3B is a cross-sectional view showing a downstream end portion in the flowing direction of intake air of a branch pipe in an intake manifold of a comparison example.
Figure 3C:
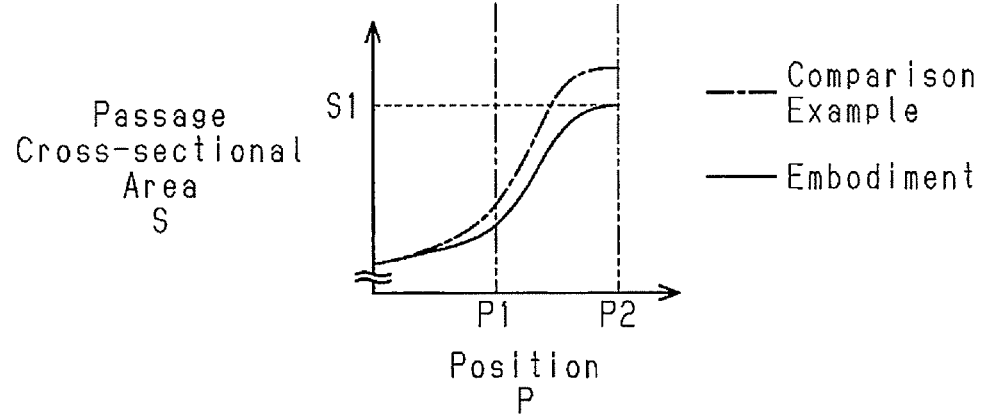
FIG. 3C is a graph showing the relationship between positions along the flow of intake and the passage cross-sectional areas corresponding to the intake manifolds of FIGS. 3A and 3B.

FIG. 3B illustrates an intake manifold of a comparison example, in which the cross-sectional area of a tumble flow passage 121 is minimized at a downstream end 123 and increases toward the upstream side.

The sum of the cross-sectional area of the main passage 20 and the cross-sectional area of the tumble flow passage 21 and the sum of the cross-sectional area of the main passage 120 and the cross-sectional area of the tumble flow passage 121 are each defined as a passage cross-sectional area S. As shown in FIGS. 3A and 3B, the passage cross-sectional area S at the downstream end 23 of the branch pipe 12 and the passage cross-sectional area S at the downstream end 123 of the branch passage 112 are determined with reference to the cross-sectional area of the intake port 41 of the cylinder head 40. Therefore, if the intake manifold of the present embodiment and the intake manifold of the comparison example are respectively connected to the same intake port 41, the passage cross-sectional areas S of the downstream ends 23 and 123 of the intake manifolds of the present embodiment and the comparison example are equal to each other.

However, in the intake manifold of the comparison example, the cross-sectional area of the tumble flow passage 121 increases from the downstream end 123 toward the upstream side. Thus, as represented by a long dashed short dashed line in FIG. 3C, the passage cross-sectional area S at a position P2 in the vicinity of the upstream end 122 is significantly larger than an ideal cross-sectional area S1 for maximizing the intake efficiency of intake air into the cylinders in an engine operating state with the valve 30 open. The ideal cross-sectional area S1 varies depending on the specifications of the internal combustion engine such as the displacement.

In contrast, the intake manifold of the present embodiment has the restrictor 17, which is located between the upstream end 22 and the downstream end 23 in the intake flow direction of the tumble flow passage 21. Thus, while increasing the flow velocity of the intake air flowing through the tumble flow passage 21, the cross-sectional area of the upstream end 22 of the tumble flow passage 21 can be made small compared to that of the comparison example, as represented by the solid line in FIG. 3C. Therefore, compared to the configuration of the comparison example, the passage cross-sectional area S at the position P2 in the vicinity of the upstream end 22 is small. This brings the passage cross-sectional area S of the tumble flow passage 21 in the vicinity of the upstream end 22 closer to the ideal cross-sectional area S1. This allows a greater amount of intake air to be drawn into the cylinders so that the engine output is increased.

The intake duct according to the present embodiment described above has the following advantages.

(1) The intake manifold has the branch pipes 12 connected to the intake ports 41 of the cylinder head 40. Each branch pipe 12 has the partition 16, which extends in the direction of the intake air flow, the main passage 20 defined by the partition 16, the tumble flow passage 21 serving as the auxiliary passage, and the valve 30 for opening and closing the main passage 20. The restrictor 17 is formed between the upstream end 22 and the downstream end 23 of the intake air flow in the tumble flow passage 21. The restrictor 17 minimizes the cross-sectional area of the tumble flow passage 21.

This configuration allows the above described operation to be performed, so that, when the engine combustion tends to be unstable, such as during a cold start, the engine combustion is stabilized while restraining increase in the fuel injection amount. Also, the engine output is increased.

(2) The partition 16 has the upstream-side inclined surface 18 located between the upstream end 22 and the restrictor 17 in the intake flow direction of the tumble flow passage 21. The upstream-side inclined surface 18 has the up-grade, which is inclined from the upstream end 22 of the tumble flow passage 21 to the middle of the inner wall surface 16a. That is, the cross-sectional area of the tumble flow passage 21 decreases from the upstream end 22 to the restrictor 17.

In this configuration, the cross-sectional area gradually decreases over the range from the upstream end 22 of the tumble flow passage 21 to the restrictor 17, which effectively increases the flow velocity of the intake air.

(3) The partition 16 has the downstream-side inclined surface 19 located between the downstream end 23 and the restrictor 17 in the tumble flow passage 21. The downstream-side inclined surface 19 has the down-grade, which is inclined from the middle of the inner wall surface 16a to the downstream end 23 of the tumble flow passage 21. That is, the cross-sectional area of the tumble flow passage 21 increases from the restrictor 17 to the downstream end 23.

This configuration allows intake air to smoothly flow from the restrictor 17 toward the downstream side, thereby reducing the pressure loss of the intake air when flowing from the restrictor 17 toward the downstream side in the tumble flow passage 21.

(4) The restrictor 17 is located at midpoint between the upstream end 22 and the downstream end 23 of the tumble flow passage 21.

This configuration prevents the rate at which the cross-sectional area of the tumble flow passage 21 changes from being excessively large either on the upstream side or the downstream side of the restrictor 17. This suppresses increase in the pressure loss of the intake air flowing through the tumble flow passage 21 and occurrence of burbles.

The above embodiment may be modified as follows.

The present invention may be applied to the intake manifold of a V engine and the intake manifold of a horizontally opposed engine.

A curved surface may be formed between the upstream-side inclined surface 18 and the downstream-side inclined surface 19 of the partition 16.

In addition to the upstream-side inclined surface 18 of the partition 16, an inclined surface may be formed on a part of the flow passage surface 15 of the inner wall 14 of each branch pipe 12 that faces the upstream-side inclined surface 18. In this case, the additional inclined surface on the flow passage surface 15 has an up-grade inclined from the upstream end 22 of the tumble flow passage 21 to the middle of the flow passage surface 15. When forming an inclined surface on flow passage surface 15, the upstream-side inclined surface 18 of the partition 16 may be omitted.

The restrictor 17 may be formed at a position that is closer to the upstream end 22 or closer to the downstream end 23 than the midpoint between the upstream end 22 and the downstream end 23 of the tumble flow passage 21.

The cross-sectional area of a part of the tumble flow passage 21 that is on the downstream side of the restrictor 17 may be constant in the intake air flowing direction.

For example, the downstream end portion of each branch pipe 12 of the intake manifold, that is, the part at which the valve 30 and the partition 16 are provided, may be provided in an intake duct that is formed separately from the manifold main body. In other words, intake ducts each having a valve 30 and a partition 16 are provided separately. These intake ducts are fixed to the downstream ends of a manifold main body that does not have the valves 30 or the partitions 16.

The present invention may be applied to an intake duct connected to the intake port of a single-cylinder engine.

What is claimed is:

1. An intake duct configured to be connected to an intake port of a cylinder head, the intake duct comprising:
   a partition disposed within the intake duct that extends in a direction of intake air flow and that partitions the intake duct into a passage and an auxiliary passage, the partition having a terminal in an upstream direction of intake air flow of the main passage and the auxiliary passage; and
   a valve disposed within the intake duct that opens and closes the main passage, wherein
   a restrictor that minimizes a cross-sectional area of the auxiliary passage is provided between an upstream end and a downstream end in the direction of intake air flow of the auxiliary passage,
   the cross-sectional area of the auxiliary passage increases from the restrictor toward the downstream end, and
   the valve is configured to close the main passage by contact with the terminal end of the partition.

2. The intake duct according to claim 1, wherein the cross-sectional area of the auxiliary passage decreases from the upstream end toward the restrictor.

3. The intake duct according to claim 2, wherein the restrictor includes:
   an upstream-side inclined guide surface of the partition that is inclined towards an inner wall of the auxiliary passage; and
   a downstream-side declined guide surface of the partition that is declined away from the inner wall of the auxiliary passage.

* * * * *